United States Patent [19]

Kukkala et al.

[11] Patent Number: 5,717,024
[45] Date of Patent: Feb. 10, 1998

[54] PROCESS FOR MAKING AQUEOUS POLYURETHANE DISPERSIONS

[75] Inventors: Pravin K. Kukkala, Raritan, N.J.; Andrew J. Kielbania, Chalfont, Pa.; Andrew P. Full, Somerville; Antonios Tontisakis, Englewood Cliffs, both of N.J.

[73] Assignee: National Starch and Chemical Investment Holding Corporation, Wilmington, Del.

[21] Appl. No.: 606,370

[22] Filed: Feb. 23, 1996

[51] Int. Cl.⁶ .................... C08J 3/00; C08K 3/20; C08L 75/00
[52] U.S. Cl. .................. 524/591; 524/539; 524/839; 524/840
[58] Field of Search ................. 524/539, 591, 524/839, 840

[56] References Cited

U.S. PATENT DOCUMENTS 4,501,852  2/1985  Markusch et al. ............ 524/839

FOREIGN PATENT DOCUMENTS 2 209 758  5/1989  United Kingdom ........... C08G 18/28
2 209 759  5/1989  United Kingdom ........... C08G 18/10

OTHER PUBLICATIONS

D. Dietrich, "Aqueous Emulsions, Dispersions and Solutions of Polyurethanes; Synthesis and Properties", *Progress in Organic Coatings*, 9 (1981) pp. 281–340.

James W. Rosthauser and Klaus Nachtkamp, "Waterborne Polyurethanes", Adv. Urethane Science and Technology, 1987, pp. 121–162.

*Primary Examiner*—Patrick Niland
*Attorney, Agent, or Firm*—Jane E. Gennaro

[57] ABSTRACT

A process for preparing aqueous dispersions of polyurethanes comprises dispersing polyurethane prepolymer containing unreacted —NCO functionality in water with moderate agitation at a temperature at or below 65° C., preferably at or below 38° C., and more preferably within the range 38°–25° C.; simultaneously reducing the agitation to a mild rate and maintaining the temperature within the range 38°–85° C., preferably, 60°–65° C., until the reaction of —NCO with water levels off; adding an effective amount of a quenching agent to react with sufficient —NCO functionality to reduce the number of available —NCO groups that can react with water so that the evolution of $CO_2$ is reduced or eliminated during storage of the polyurethane dispersion; and at any of the previous sequential steps adding an effective amount of a deaerating agent to reduce or eliminate $CO_2$ foaming or to liberate any dissolved $CO_2$ gas.

6 Claims, No Drawings

PROCESS FOR MAKING AQUEOUS POLYURETHANE DISPERSIONS

FIELD OF THE INVENTION

This invention relates to a process for making aqueous polyurethane dispersions.

BACKGROUND OF THE INVENTION

Waterborne polyurethanes are important industrial products suitable for a myriad of application areas. The typical waterborne polyurethane is actually a polyurethane-polyurea, in which the polyurethane segments are formed by the addition reaction between polyisocyanates and polyols, and the polyurea segments are formed by the addition reaction between polyisocyanates and polyamines. Two factors contribute significantly to high performance properties in polyurethanes, such as hardness, abrasion resistance, heat resistance, and solvent resistance. These are high molecular weight and a high concentration of urea groups.

Most commercial processes for the production of high molecular weight polyurethanes begin with the formation of a medium molecular weight prepolymer with terminal isocyanate (—NCO) groups. The prepolymer is prepared neat, in solvent, or in monomer used as a diluent. Build-up to high molecular weight is accomplished subsequently by a variety of chain extension steps in which the isocyanate groups are reacted with amines. In the production of polyurethane dispersions, the prepolymer typically will be dispersed in an aqueous medium containing amine. Amino groups, especially those bound to aliphatic residues, react with the —NCO functionality orders of magnitude faster than does water, making it possible to perform an amine chain extension in the presence of water and to obtain a high concentration of urea groups.

In some cases it is preferable to chain extend solely in water without an added amine. In that case, the isocyanate reacts with the water to give the unstable carbamic acid, which decomposes to give an amine and carbon dioxide. The amine formed in situ then reacts with the isocyanate. Chain extending in water allows a rapid build of molecular weight while simultaneously resulting in a fine dispersion. Nevertheless, this process leads to several problems in industrial scale productions: initially, the rapid reaction of —NCO with water results in the evolution of carbon dioxide and severe foaming; not all —NCO groups react rapidly, leaving some to react with water during storage of the product and resulting in a pressure build-up in storage containers; and attempts to react off all NCO groups increase the cycle time significantly. These problems are accentuated when the —NCO:—OH ratio is greater than 1:1 or when the milliequivalents of —NCO per gram of polymer is greater than 2% by weight (to favor high molecular weight). Consequently, a method to reduce or eliminate these problems in the commercial manufacture of high molecular weight polyurethanes would be highly advantageous.

SUMMARY OF THE INVENTION

This invention is a process for preparing aqueous dispersions of polyurethanes in a sequence of steps that permit an industrial scale manufacture with reduced CO2 foaming, reduced cycle times, and reduced evolution of $CO_2$ on storage.

The process comprises the sequential steps of: (a) providing a polyurethane prepolymer, the prepolymer being a polymer having unreacted isocyanate functionality (—NCO), formed from a reaction mixture of alcohols and isocyanates; (b)dispersing the prepolymer in water with moderate agitation at a temperature below 65° C., preferably below 38° C., and more preferably between 38°–25° C.; (c) simultaneously reducing the agitation to a mild rate and adjusting the temperature to within the range 38°–85° C., preferably, 60°–65° C., until the reaction of —NCO with water levels off; (d) adding an effective amount of a quenching agent to react with sufficient —NCO functionality to reduce the number of available —NCO groups that can react with water so that the evolution of $CO_2$ is reduced or eliminated during storage of the polyurethane dispersion; (e) agitating at a moderate rate to liberate any dissolved $CO_2$ while maintaining the temperature within the range 38°–85° C., preferably, 60°–65° C.; and (f) at any of the sequential steps (a) through (e) adding an effective amount of a deaerating agent to reduce or eliminate $CO_2$ foaming or to liberate any dissolved $CO_2$ gas.

It was unexpected that this sequence and balance of temperature range and agitation rates would eliminate the severe problem of $CO_2$ evolution (foaming) presented during industrial manufacture of polyurethane dispersions, and the consequent increase in cycle times and storage problems.

DETAILED DESCRIPTION OF THE INVENTION

The preparation of the prepolymer can be made from any of the polyiso-cyanates and polyols known from conventional polyurethane chemistry. The main criterion for the isocyanate is that it exhibit sufficient stability towards water during processing. The preferred isocyanates are cycloaliphatic diisocyanates. The polyols can be chosen from a wide range of linear or slightly branched polyether, polyester, and polycarbonate polyols, many of which are commercially available. Short chain diols and triols may be used to adjust the urethane group content and polymer branching, and other polyols, such as epoxy-resins, hydroxy acrylates, or hydroxy-containing polybutadienes, may be used to impart special properties. The polyamines, which are usually employed as chain-extending agents, are preferably aliphatic or cycloaliphatic di- or triamines. Amine-terminated polyethers and hydrazines may also be used as chain-extending agents.

The polyurethane prepolymer may be prepared neat (without any solvent or diluent), in solvent, which is typically a water-miscible solvent, or in a vinyl monomer, which can later be polymerized with the polyurethane.

For purposes herein, mild agitation is defined to be less than 50 revolutions per minute (rpm) and moderate agitation to be 50 or greater revolutions per minute, in a 500 gallon dispersion vessel with a diameter of 48 inches, turbine diameters of 24 inches, two levels of turbines with four blades each pitched at 45 degrees and spaced 24 inches apart, with the lower turbine located 24 inches from the bottom of the dispersion vessel.

After preparation, the prepolymer is dispersed with water with moderate agitation at a temperature below or at 65° C., preferably below or at 38° C., and more preferably within the range 38°–25° C. (As used herein, range means each and every point within the limits noted, including the end points, or any range within and including the end points.) Limiting the temperature during the initial dispersion of the prepolymer to at or below 65° C. decelerates the rate of reaction of water with the —NCO groups. This minimizes foaming and helps to reduce the time to achieve full dispersion.

Typically water is added to the prepolymer until phase inversion occurs; alternatively, the prepolymer can be dispersed by addition into water. The rate of addition (of either the water or prepolymer) is adjusted to what is physically possible given the scale of the production, and appropriate addition rates are known to those skilled in the art.

After the dispersion is formed, the agitation of the reaction is reduced to a mild rate, which limits the evolution of carbon dioxide gas and minimizes foaming. This also serves to shorten cycle time. Simultaneously, the temperature is adjusted to within the range 38°–85° C., more preferably, 60°–65° C., to accelerate the reaction of the —NCO groups with water and cause the chain extension of the polyurethane to occur. The agitation is continued for a time until the point when the —NCO reaction with water levels off. This point can be determined by monitoring the relative amount of —NCO functionality over time by infrared spectrometry. In practice, once this point is determined for a particular production scale and chemistry, that time can be used as a benchmark for similar productions without the necessity of monitoring each reaction.

After the reaction of —NCO and water levels off, an effective amount of a quenching agent is added to the reaction to react with sufficient of the residual —NCO functionality to reduce the number of available —NCO groups that can be reacted with water so that the evolution of $CO_2$ is reduced or eliminated during storage of the polyurethane dispersion. The reagent should be chosen so that it does not alter the properties of the resultant polyurethane. Preferable quenching agents are ammonia or isophorone diamine. The upper limit of the amount of quenching agent to be added will be equivalent to the number of moles of residual or unreacted diisocyanate theoretically present in the prepolymer in the dispersion (when the —NCO:—OH ratio is greater than 1.0). In practice, the upper limit can be determined by IR spectroscopy. As will be understood, in order to preserve the high performance properties of the final product, and to maintain high molecular weight, the least amount of quenching agent that can be used and still accomplish no pressure build-up during storage is the preferred amount. Experience has shown that the actual amount of quenching agent will be dependent on the batch size of the reaction, on the chemistry of the prepolymer, and on the specific quenching agent chosen. Modification of the amount of quenching agent used based on these factors is within the expertise of one skilled in the art.

After the quenching agent is added, agitation is then increased to a moderate rate to liberate any dissolved $CO_2$ and is continued until any foaming considerably slows down or stops. The temperature during the quenching and subsequent agitation steps is maintained within the range 38°–85° C., preferably 60°–65° C.

At any of the above steps in the process a deaerator may be added to control the rate of evolution of the $CO_2$ gas when it is excessive or to assure that any dissolved $CO_2$ gas is eliminated. Foaming (evolution of $CO_2$ gas) is most likely to be excessive during steps requiring the higher temperatures and higher agitation, and less likely during quenching. Excessive foaming is intended here to mean that the reaction vessel cannot contain the foam and that the reaction rate must be reduced or the reaction halted until the foaming subsides. Suitable deaerators typically and preferably comprise mixed fatty acids in a hydrocarbon distillate. Examples of suitable deaerators are sold under the tradenames: Dee Fo 3000 and Foamtrol 103 by Ultra Additives of Paterson, N.J.; Foamaster-DF-122NS and DF1867 by Henkel Corp. of Ambler, Pa.; PD-SEW-Series by Akzo Nobel Chemicals, Inc., of Chicago, Ill.; Bubblebreaker by Witco Corp. of Greenwich, Conn.; and Actrafoam C.S by Climax Performance Materials Corp. of Summit, Ill. The deaerator is added in an effective amount to reduce the evolution of $CO_2$ so that excessive foaming does not occur, or to liberate any microscopic $CO_2$ bubbles that may remain trapped in the dispersion and which would surface later as pinholes when the polyurethane is applied in its end use. Customarily, an effective amount will be about 0.01 percent by weight of the total dispersion, for any step at which the deaerator is added. As will be recognized the presence of deaerator in a high enough quantity may have a deleterious effect on the properties of the resultant polyurethane, and that quantity will be peculiar to the specific polyurethane and its end use application. Consequently, the minimum amount of deaerator that can be used and still be effective to control foaming should be used at any one step in the process.

EXAMPLES

The following examples serve to augment the detailed description of the invention. A polyurethane prepolymer, as described following, was prepared and used in each of the following examples. In an initial control reaction, the prepolymer was dispersed with 60° C. water and excessive foaming occurred. That control was abandoned.

Preparation and Dispersion of Prepolymer

Polypropylene glycol (150 g, Mw 2025) and dimethylol propionic acid (12 g) were charged to a four-necked two-liter reaction flask and heated to 120° C. for 30 minutes under a strong nitrogen purge sufficient to drive off any moisture. The mixture was cooled to 80° C., isophorone diisocyanate (66.6 g) was added to the flask, and the temperature maintained at 80° C. for three hours. The mixture was then cooled to 60° C., and triethylamine (9.3 g) was added over a period of 15 minutes. The reaction contents (the prepolymer) were thoroughly agitated for ten minutes and then dispersed with the addition of 25° C. water (461 g) rapidly added to the reaction flask. Prepolymers were made by this process independently for each of the examples.

In the subsequent examples, the reactions were monitored for the reduction in —NCO functionality by measuring the relative absorbance of the —NCO peak (2270 $cm^{-1}$) using a Fourier Transform-Infrared Spectrometer, Model Magna-IR 550, obtained from Nicolet Instrument Corporation, Madison, Conn., at time intervals up to 180 minutes after the initial dispersion.

Example I: After dispersion of the prepolymer, the temperature was brought to 60° C. within 15 minutes. There was some foaming, which was controlled and did not require that the reaction be stopped. No quenching agent was added. The percent relative residual —NCO at the reported time intervals after the initial dispersion are the following:

| Time after dispersion | Percent —NCO |
|---|---|
| $T^0$ - Immediately | 100 |
| $T^{15}$ - 15 min | 59.6 |
| $T^{30}$ - 30 min | 57.2 |
| $T^{45}$ - 45 min | 63.2 |
| $T^{60}$ - 60 min | 55.3 |
| $T^{120}$ - 120 min | 27.5 |

The data indicate that the reaction rate, for this reaction, is fastest in the first fifteen minutes (a 40% decrease in —NCO) and then levels off during the remainder of the first hour (with an additional 5% decrease). The data also indicate that without any other treatment other than the increase in temperature to 60° C., the mole percent of —NCO functionality could only be reduced to 27.5% after two hours.

Example II. After dispersion of the prepolymer, the temperature was brought to 60° C. within 15 minutes. Based on the rate of reaction observed in Example I, the quenching agent, 2.05 g of a 10% by weight solution of NH$_4$OH (equivalent to 2.2 mol % of unreacted diisocyanate) was added one hour after the dispersion of the prepolymer with mild agitation. The mole percent relative residual —NCO at the reported time intervals are the following:

| Time after dispersion | Percent —NCO |
| --- | --- |
| T$^0$ - Immediately | 100 |
| T$^{60}$ - 60 min, post-add NH$_4$OH | 25.9 |
| T$^{75}$ - 75 min, 15 min after NH$_4$OH | 31.2 |
| T$^{90}$ - 90 min, 30 min after NH$_4$OH | 19.1 |
| T$^{105}$ - 105 min, 45 min after NH$_4$OH | 12.2 |
| T$^{120}$ - 120 min, 60 min after NH$_4$OH | 10.0 |
| T$^{180}$ - 180 min, 120 min after NH$_4$OH | 6.8 |

These data indicate that after two hours the mole percent of residual —NCO functionality could be brought to 6.8%.

Example III. After dispersion of the prepolymer, the temperature was brought to 60° C. within 15 minutes. One hour after the dispersion of the prepolymer, 5.83 g of a 27% weight solution of IPDA (equivalent to 7 mole percent of unreacted diisocyanate) was added with mild agitation. The mole percent relative residual —NCO at the reported time intervals are the following:

| Time after dispersion | Percent —NCO |
| --- | --- |
| T$^0$ - Immediately | 100 |
| T$^{60}$ - 60 min, post-add IPDA | 53.7 |
| T$^{75}$ - 75 min, 15 min after IPDA | 35.1 |
| T$^{90}$ - 90 min, 30 min after IPDA | 21.2 |
| T$^{105}$ - 105 min, 45 min after IPDA | 8.8 |
| T$^{120}$ - 120 min, 60 min after IPDA | 4.4 |

Example IV. Thirty minutes after dispersion of the prepolymer, 5.83 g of a 27% weight solution of IDPA was added with mild agitation. The temperature was raised to 60° C. at 60 minutes after dispersion and held at that temperature for 30 minutes. The mole percent relative residual —NCO at the reported time intervals are the following:

| Time after dispersion | Percent —NCO |
| --- | --- |
| T$^0$ - Immediately | 100 |
| T$^{15}$ - 15 min | 82.3 |
| T$^{30}$ - 30 min, post-add IDPA, temperature at 35° C. | 68.2 |
| T$^{45}$ - 45 min, 15 min after IPDA | 42.4 |
| T$^{60}$ - 60 min, 30 min after IPDA, temperature raised to 60° C. | 29.9 |
| T$^{75}$ - 75 min, 45 min after IPDA | 21.9 |
| T$^{90}$ - 90 min, 60 min after IPDA | 11.4 |

Example V. Sixty minutes after dispersion of the prepolymer, 5.83 g of a 27% weight solution of IDPA was added with mild agitation. The temperature was raised to 60° C. at 90 minutes after dispersion and held at that temperature for 60 minutes. The mole percent relative residual —NCO at the reported time intervals are the following:

| Time after dispersion | Percent —NCO |
| --- | --- |
| T$^0$ - Immediately | 100 |
| T$^{15}$ - 15 min | 88.2 |
| T$^{30}$ - 30 min, temp at 27° C. | 82.3 |
| T$^{45}$ - 45 min | 72.4 |
| T$^{60}$ - 60 min, post-add IPDA | 69.3 |
| T$^{75}$ - 75 min, 15 min after IPDA | 63.9 |
| T$^{90}$ - 90 min, 30 min after IPDA, temperature raised to 60° C. | 58.2 |
| T$^{105}$ - 105 min, 45 min after IPDA | 24.1 |
| T$^{120}$ - 120 min, 60 min after IPDA | 14.9 |
| T$^{135}$ - 135 min, 75 min after IPDA | 12.2 |
| T$^{150}$ - 150 min, 90 min after IPDA | 3.0 |

The results of Examples I through III show that there is a substantial percentage of residual —NCO even two hours after the initial dispersing of room temperature water. In contrast, quenching with NH$_4$OH resulted in only 6.8% residual —NCO three hours after the initial dispersing and two hours after the addition of the NH$_4$OH, and quenching with IPDA resulted in only 4.4% residual —NCO two hours after the initial dispersing and one hour after the addition of the IPDA.

Examples IV and V show that the rate of decrease in the residual —NCO level is dependent not only on quenching but on an increase in reaction temperature after the dispersion of the prepolymer.

Example VI. The same prepolymer made in the previous examples was made on an industrial scale and dispersed with 25° C. water. The dispersion was made by adding 897 Kg (1976 lbs) of water to 495 Kg (1090 lbs) of prepolymer at 60° C. (140° F.). Three samples were drawn off from the reactor and stored in 208 L (55 gal) drums after being treated according to the following procedure:

After dispersion, the reactor contents were held at 38° C. (100° F.) for one hour. A 202 Kg (445 lbs) sample was drawn off into a closed head drum (Drum #1) equipped with a pressure gauge and a relief valve (156 KPa)(8 psig).

To the remaining reactor contents, 19.5 Kg (43 lbs) of a 1.7 weight percent ammonia solution were added in one shot. The reactor contents were held at 38° C. (100° F.) for 15 minutes. A 202 Kg (445 lbs) sample was drawn off into a closed head drum (Drum #2) equipped with a pressure gauge and a relief valve.

The temperature of the remaining reactor contents was increased to 65° C. (about 150° F.) and held at that temperature for 30 minutes. (Level of foam began to increase at this temperature.) The reactor contents were cooled to 38° C. (100° F.), and a 202 Kg (445 lbs) sample was drawn off into a closed head drum (Drum #3) equipped with a pressure gauge and a relief valve.

The same prepolymer made for the previous drum samples was made in a separate industrial scale batch (60° C., 140° F.) and dispersed with 25° C. water. The temperature of the resulting dispersion equilibrated to 38° C., and then sufficient ammonia solution was added to bring the concentration of ammonia in the reactor to 0.023 weight percent (equivalent to 6.6 mol % of unreacted diisocyanate). The reactor contents were heated to 60° C. (140° F.) and sufficient deaerator (Dee Fo 3000, Ultra Additives of Paterson, N.J.) was added to bring the concentration of deaerator to 0.05 weight percent. The reactor contents were cooled to 60° C. (100° F.), and a 202 Kg (445 lbs) sample was drawn off into a closed head drum (Drum #4).

The pressure in each drum was observed every hour. If the pressure of the drum exceeded 135 KPa (5 psig) the gas in the drum was released until the pressure dropped to 101 KPa (0 psig). When the pressure was at the level of 115 KPa (2 psig), the drum visibly bulged. The number of times the pressure was released in 48 hours was recorded, the lower the number, the more effective the procedure for reducing the evolution of $CO_2$ gas.

The physical characteristics of the polyurethane dispersions, the number of pressure releases in 48 hours, and the drum pressure at the end of two weeks are reported here.

|  | Drum #1 | Drum #2 | Drum #3 | Drum #4 |
|---|---|---|---|---|
| % Solids | 34.1 | 33.5 | 33.2 | 31.0 |
| Particle size nm | 113 | 110 | 79 | 77 |
| Grit (200)* % by weight | 0.0036 | 0.0036 | 0.0068 | 0.0502 |
| Grit (325)* % by weight | not tested | not tested | 0.0094 | 0.0423 |
| pH | 7.4 | 7.2 | 7.4 | 7.14 |
| Viscosity mPa · s | 14 | 12 | 22 | 18 |
| # Pressure Releases/48 hrs | 10 | 5 | 0 | not recorded |
| Pressure ( ) at 2 weeks | 2.5 | 2.0 | less than gauge | no bulge |

*The grit was caught on a 200 or 325 mesh screen.

Example VII. In separate industrial scale batches, the same prepolymer made in the previous examples was prepared and treated with ammonia or with ammonia and deaerator as described in Example VI. The process conditions, process time, and presence of pressure in the storage drums are recorded here. The record shows that the process time is considerably shortened when the inventive procedure is followed and that there is no pressure build-up on storage (in 208 L, 55 gal drums). In the following table, weight percent values are based on the total weight of the dispersion, and mole percent values are given per mole of unreacted diisocyanate in the prepolymer.

| Process Conditions | Batch #1 | Batch #2 | Batch #3 | Batch #4 |
|---|---|---|---|---|
| Dispersion Temperature | (140° F.) 60° C. | (100° F.) 37.5° C. | (100° F.) 37.5° C. | (100° F.) 37.5° C. |
| Ammonia | 0 wt % 0 mol % | 0 wt % 0 mol % | 0.023 wt % 6.6 mol % | 0.023 wt % 6.6 mol % |
| Deaerator Wt percent | 0 | 0 | 0 | 0.05 |
| Foam level | excessive | moderate | moderate | slight |
| Process time in hours | 10.5 | 11.5 | 13.75 | 8.5 |
| Description of Drums | bulging | bulging | slight bulging | no bulging |

What is claimed is:

1. A process for making polyurethane dispersions comprising the sequential steps of:

(a) providing a polyurethane prepolymer, the prepolymer being a polymer having unreacted isocyanate functionality (—NCO), formed from a reaction mixture of alcohols and isocyanates;

(b) dispersing the prepolymer in water with moderate agitation at a rate effective to achieve full dispersion and at a temperature below or equal to 65° C.;

(c) simultaneously reducing the agitation speed to a mild rate effective to limit the evolution of carbon dioxide gas and minimize foaming and maintaining the temperature within the range 38°–85° C.;

(d) adding an effective amount of a quenching agent to react with sufficient —NCO functionality to reduce the number of available —NCO groups that can react with water so that the evolution of $CO_2$ is reduced or eliminated during storage of the polyurethane dispersion;

(e) agitating at a moderate rate to liberate any dissolved $CO_2$ while maintaining the temperature within the range 38°–85° C.; and (f) at any of the sequential steps (a) through (e) adding an effective amount of a deaerating agent to reduce or eliminate $CO_2$ foaming or to liberate any dissolved $CO_2$ gas;

in which mild agitation is defined to be less than 50 revolutions per minute and moderate agitation to be 50 or greater revolutions per minute, in a 500 gallon dispersion vessel with a diameter of 48 inches, turbine diameters of 24 inches, two levels of turbines with four blades each pitched at 45 degrees and spaced 24 inches apart, with the lower turbine located 24 inches from the bottom of the dispersion vessel.

2. The process according to claim 1 in which the dispersion temperature in step b is at 38° C. or lower.

3. The process according to claim 2 in which the dispersion temperature in step b is between 25°–38° C.

4. The process according to claim 1 in which the dispersion at step c is maintained within the range 60°–65° C.

5. The process according to claim 1 in which the quenching agent is $NH_4OH$ or isophorone diamine.

6. The process according to claim 1 in which the deaerating agent comprises mixed fatty acids in a hydrocarbon distillate.

* * * * *